(12) United States Patent
Abdulkhair et al.

(10) Patent No.: US 12,281,024 B1
(45) Date of Patent: Apr. 22, 2025

(54) COPPER OXIDE-MAGNESIUM (CuO.MgAl2O4) SPINEL NANOCOMPOSITE AND METHOD OF SYNTHESIS THEREOF

(71) Applicant: IMAM MOHAMMAD IBN SAUD ISLAMIC UNIVERSITY, Riyadh (SA)

(72) Inventors: Babiker yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/954,299

(22) Filed: Nov. 20, 2024

(51) Int. Cl.
*C01G 3/02* (2006.01)
*B82Y 30/00* (2011.01)
*C01G 3/00* (2006.01)

(52) U.S. Cl.
CPC .............. *C01G 3/02* (2013.01); *B82Y 30/00* (2013.01); *C01G 3/006* (2013.01); *C01P 2002/70* (2013.01); *C01P 2004/03* (2013.01); *C01P 2004/64* (2013.01); *C01P 2006/14* (2013.01); *C01P 2006/40* (2013.01)

(58) Field of Classification Search
CPC ..... C01G 3/006; B82Y 30/00; C01P 2002/70; C01P 2004/04; C01P 2004/64; C01P 2006/14; C01P 2006/40
See application file for complete search history.

(56) References Cited

U.S. PATENT DOCUMENTS

| 12,043,778 B2 | 7/2024 | Jung et al. |
| 2017/0075467 A1 | 3/2017 | Kim et al. |
| 2023/0415125 A1* | 12/2023 | Lambert .............. B01J 37/0205 |

FOREIGN PATENT DOCUMENTS

| CN | 1109036 A | 9/1995 | |
| CN | 118287083 | * 5/2024 | ............ B01J 23/005 |
| WO | WO 2012/157300 A1 | 11/2012 | |

OTHER PUBLICATIONS

A. Elmhamdi et al., "Characterization and catalytic properties of CuO/CeO2/MgAl2O4 for preferential oxidation of CO in H2-rich streams", Applied Catalysis B: Environmental, vol. 186, Feb. 6, 2016, pp. 292-304.

* cited by examiner

*Primary Examiner* — Anthony J Zimmer
*Assistant Examiner* — Eric Scott Sherman
(74) *Attorney, Agent, or Firm* — Oblon, McClelland, Maier & Neustadt, L.L.P.

(57) ABSTRACT

A nanocomposite having ionic conductivity and having the general formula $CuO \cdot MgAl_2O_4$ wherein: copper oxide (CuO) is present in an amount of from about 5 to about 15 weight percent (wt. %) of the total weight of the nanocomposite; and, CuO is present as a monoclinic crystal phase within the nanocomposite, as determined by X-ray diffraction (XRD).

10 Claims, 8 Drawing Sheets

50

52 — Add distilled water and copper (II) nitrate ($Cu(NO_3)_2$) to a powdered mixture of non-reducing sugar, hydrated aluminium nitrate ($Al(NO_3)_3$) and hydrated magnesium acetate ($Mg(Ac)_2$)

54 — In a first heat stage, heat the reaction mixture to a temperature of from about 50 to about 100 degrees Celsius (°C) to form a solution 56 — In a second heat stage, heat the solution to a temperature of from about 150 to about 200 °C for a duration sufficient to carbonize the non-reducing sugar 58 — Comminute the carbonized product of the second heat stage 60 — Calcine the comminuted product at a temperature of from about 500 to about 1200 °C for a duration of from about 1 to about 5 hours (h)

COPPER OXIDE-MAGNESIUM (CuO.MgAl2O4) SPINEL NANOCOMPOSITE AND METHOD OF SYNTHESIS THEREOF

STATEMENT OF ACKNOWLEDGEMENT

Support provided by the Imam Mohammad Ibn Saud Islamic University (IMSIU) is gratefully acknowledged.

BACKGROUND

Technical Field

The present disclosure is directed to a nanocomposite, more particularly, a copper oxide-magnesium aluminate spinel nanocomposite (CuO·MgAl$_2$O$_4$) for electrochemical applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Currently, the increased population and world demand for energy have resulted in energy crises and global warming issues. In recent times, energy has been primarily obtained from non-renewable sources like fossil fuels, which are costly and contribute to environmental pollution and depletion of energy reserves. Researchers are therefore trying to find alternative renewable energy sources that are sustainable and environmentally friendly, such as solar energy and wind energy; these energy sources, however, depend on weather conditions, which necessitates the co-development of energy storage solutions. This problem can be overcome by prerequisite storage equipment such as supercapacitors (SC), fuel cells (FC), and lithium-ion batteries (Li-ion batteries). Among these, supercapacitors have gained particular attention as energy storage devices; they offer low cost, eco-friendliness, longer cyclic life, high specific energy (E), high specific power (P), and superior capacitance (C), allowing for effective fast charging and discharging compared to batteries, which have higher cycle counts, low power density, and maintenance issues.

Supercapacitors are classified into two major categories according to their storage mechanisms: pseudocapacitors (PC); and, electric double-layer capacitors (EDLC). The hybrid nature of supercapacitors is evident in newly developed types that combine the properties of both EDLCs and PCs, utilizing combinations of carbon-based materials and transition metal oxides/chalcogenides, thereby exhibiting both non-faradic and faradic charge storage mechanisms.

Mixed metal oxides possessing spinel structures have proven effective in electrode materials in catalysts, supercapacitors, and lithium-ion batteries due to their high redox reactivity. Several studies have focused on the preparation of MgAl$_2$O$_4$ spinel structures using different methods, such as: conventional solid-state reaction; sol-gel processes; spray drying (atomization); co-precipitation; microwave-assisted combustion synthesis; hydroxide co-precipitation; hydrothermal processes; modified Pechini processes; and, organic gel-assisted citrate complexation. [See: Ganesh, I.; Johnson, R.; Rao, G. V N.; Mahajan, Y. R.; Madavendra, S. S.; Reddy, B. M. *Ceram. Int.* 2005, 31, 67-74, Adak, A. K.; Saha, S. K.; Pramanik, P. *J. Mater. Sci. Lett.* 1997, 16, 234-235, Ryshekewitch, E. *Oxide Ceramics*, Academic Press, New York 1960, pp. 257, Kriegel, W W.; Palmer III, H; Choi, D. M *Spec. Ceram.* 1964, 3, 167-186, Bakker, W T.; Lindsay, L. G. *Am. Ceram. Soc. Bull.* 1967, 46, 1094-1097, Bailey, J. T.; Russell, R. *Am. Ceram. Soc. Bull.* 1968, 47, 1025-1029, Hamono, K.; Kanzaki, S. *J. Ceram. Soc. Jpn.* 1977, 85, 225-230. Kostic, E.; Momcilovic, L. *Ceramurgia Int.* 1977, 3, 57-60.]. Few works have examined the electrical properties of MgAl$_2$O$_4$ [See: Gualtiero, G.; Giampiero, M; Enrico, T J. *Am. Ceram. Soc.* 1993, 76, 743-750, J. Ahmad, M Q. Awan, M. E. Mazhar, MN Ashiq, *Physica B* 406 (2011) 254-258, K. Izumi, T. Mizokawa, E. Hanamura, *J. Appl. Phys.* 102 (2007) 053109, M. J. Iqbal, B. Kishwar, *Mater. Res. Bull.* 44 (2008) 753-758, S. Kurien, S. Sebastian, J Mathew, K. C. George, Indian *J. Pure Appl. Phys.* 42 (2004) 926-933.]. The electrical properties of both thin film and bulk MgAl$_2$O$_4$ at 313 K were studied in environments with different relative humidity values ranging from 2 to 95%, using AC impedance spectroscopy in the 0.1 hertz (Hz)-10 kilohertz (kHz) frequency range [See: Gualtiero, G.; Giampiero, M; Enrico, T. *J. Am. Ceram. Soc.* 1993, 76, 743-750.].

The doping of an oxide may contribute to improving its electrical and physical properties. Although different synthesis techniques may modify the characteristics of MgAl$_2$O$_4$ to some extent, doping the parent lattice with appropriate cations is a commonly employed strategy for improving and changing the physical properties of the material. The effects of substitution of both cobalt (Co$^{2+}$) and zinc (Zn$^{2+}$) have been examined by several researchers [See: J. Ahmad, M. Q. Awan, M. E. Mazhar, MN Ashiq, *Physica B* 406 (2011) 254-258, K. Izumi, T. Mizokawa, E. Hanamura, *J Appl. Phys.* 102 (2007) 053109.]. There are, however, few examples of studies on the modification of electrical properties throughdoping despite applications which require materials of high electrical resistivity, low dielectric constant, and low dielectric loss factor being numerous and including electrical insulation, capacitors, integrated circuit substrates, and microwave technologies. Similarly, there are few studies on the use of specific additives to create magnesium aluminate spinel composites of controlled heat capacity, thermal diffusivity, and thermal conductivity. [See: Z. T Zhang, W C. Li, S. Seetharaman, *Metall. Mater. Trans.* B 37 (2006) 615-621]. The composite materials of these studies are suitable for thermal insulation in refractories, furnace linings, and electrode materials, as doping with appropriate cations can reduce thermal conductivity.

Although several nanocomposites have been developed in the past for electrochemical applications, there still exists a need to fabricate composite materials with enhanced electrical conductivity and dielectric properties.

SUMMARY

In an exemplary embodiment, a nanocomposite is described. The nanocomposite has ionic conductivity and has a general formula CuO·MgAl$_2$O$_4$. In some embodiments, copper oxide (CuO) is present in an amount of from about 5 to about 15 weight percent (wt. %) of the total weight of the nanocomposite; and, CuO is present as a monoclinic crystal phase within the nanocomposite, as determined by X-ray diffraction (XRD).

In some embodiments, the nanocomposite is in the form of nanoparticles (NPs) having a median volume particle size (Dv50) of from about 20 to about 40 nanometers (nm), as determined by scanning electron microscope (SEM) analysis.

In some embodiments, the nanocomposite is in the form of NPs having a median volume particle size (Dv50) of from about 25 to about 35 nm, as determined by SEM analysis.

In some embodiments, CuO is present in an amount of from about 8 to about 12 wt. % of the total weight of the nanocomposite.

In some embodiments, CuO is present in an amount of from about 10 wt. % of the total weight of the nanocomposite.

In some embodiments, the nanocomposite has alternating current (AC) conductivity ($\sigma$). The AC conductivity demonstrates a frequency ($\omega$) dependent relationship according to the formula: $\sigma_{AC}(\omega)=A\omega^s$, wherein A is a constant and, s is from about 0.5 to about 0.9.

In some embodiments, s is from about 0.7 to about 0.8 in the nanocomposite.

In some embodiments, the nanocomposite has a dielectric constant ($\varepsilon'_r$) which, as determined at a temperature of about 25 degrees Celsius (° C.), negatively depends on the frequency of an AC applied to the nanocomposite.

In some embodiments, the nanocomposite has a dielectric constant ($\varepsilon'_r$), as determined at a temperature of about 25° C., of from about 13 to about 14 at an applied AC frequency ($\omega$) of about 2.5 megahertz (MHz) and from about 11 to about 12 at an applied AC frequency ($\omega$) of about 7.5 MHz.

In some embodiments, the nanocomposite has a dielectric loss factor ($\varepsilon''$) which, as determined at a temperature of about 25° C., negatively correlates to the frequency of an AC applied to the nanocomposite.

In some embodiments, the nanocomposite has a dielectric constant ($\varepsilon'_r$) which, as determined at a temperature of about 25° C., negatively depends on the frequency of an AC applied to the nanocomposite; and, a dielectric loss factor ($\varepsilon''$) which, as determined at a temperature of about 25° C., negatively correlates to the frequency of an AC applied to the nanocomposite.

In an exemplary embodiment, a method of synthesizing the nanocomposite is described. The method includes adding distilled water and copper (II) nitrate ($Cu(NO_3)_2$) to a powdered mixture of non-reducing sugar, hydrated aluminium nitrate ($Al(NO_3)_3$) and hydrated magnesium acetate ($Mg(Ac)_2$). The method comprises, in a first heating stage, heating the reaction mixture to a temperature of from about 50 to about 100° C. to form a solution. The method comprises, in a second heating stage, heating the solution to a temperature of from about 150 to about 200° C. for a duration sufficient to carbonize the non-reducing sugar. Further, the method comprises comminuting the carbonized product of the second heating stage and calcining the comminuted product at a temperature of from about 500 to about 1200° C. for a duration of from about 1 to about 5 hours.

In some embodiments, the reaction mixture comprises from about 10 to about 25 wt. % of non-reducing sugar, based on the solids content of the reaction mixture.

In some embodiments, the non-reducing sugar comprises at least one compound selected from the group consisting of sucrose, lactose, raffinose, stachyose, trehalose, sorbose, sucralose, melezitose, raffinose and mixtures thereof.

In some embodiments, the non-reducing sugar comprises sucrose.

In some embodiments, the comminuted product is calcined at a temperature of from about 600 to about 800° C. for a duration of from about 2 to about 4 hours.

In some embodiments, an electrode is described comprising the aforementioned nanocomposite.

In some embodiments, a fuel cell or capacitor is described including the electrode based on the aforementioned nanocomposite.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

As used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'compound' refers to a chemical entity, regardless of its phase-solid, liquid, or gaseous—as well as its state-crude mixture, purified, or isolated.

As used herein, the term 'particle' refers to a small object that acts as a whole unit with regard to its transport and properties.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Particle size is determined herein by Scanning Electron Microscopy (SEM).

As used herein, 'nanoparticles'—sometimes contracted herein to 'NPs'—refers to particles having a particle size of 1 nanometer (nm) to 500 nm.

The term 'grain' is used herein in accordance with its standard crystallographic definition as a single, individual crystal within a polycrystalline material, wherein all atoms are arranged in a consistent crystal structure. Within a polycrystalline material, the interface between two neighboring grains is referenced as the 'grain boundary'.

As used herein, the term 'room temperature' refers to a temperature range of 25 degrees Celsius (° C.)±3° C.

The term 'carbonization' as used herein refers to a thermally actuated process which transforms a carbon containing substrate to a product having an increased proportion of elemental carbon. In the present disclosure, the atmosphere of carbonization may either comprise oxygen or be oxygen free. The former alternative includes atmospheres in which the supply of oxygen is restricted. The latter alternative includes the performance of carbonization under vacuum or under an inert atmosphere, of which nitrogen and argon atmospheres may be mentioned as examples.

As used herein, the term 'calcination' refers to a thermal treatment process which is conducted in the absence of, or under a restricted supply of ambient air or oxygen. Calcination may be performed to remove impurities or volatile substances and/or to induce thermal decomposition or a change in the thermally treated material.

As used herein, 'comminuting' refers to process of reducing the average size of solid materials into smaller particles, by crushing, grinding, cutting, vibrating, or other processes.

As used herein, the term 'electrical conductivity' refers to an ability of a material to allow the flow of electric current through it and is measured in siemens per meter (S/m).

As used herein, the term 'alternating current (AC) conductivity' refers to an ability of a material to conduct electric current when an alternating voltage is applied. It reflects how well the material permits for the flow of AC, which changes direction periodically and affects the movement of charge carriers within the substance.

As used herein, the term 'charge polarization' refers to the storage of some energy in a substance when it is exposed to an external electric field.

As used herein, 'dielectric constant ($\varepsilon'$)' refers to a measure of the amount of electric potential energy, in the form of induced polarization that is stored in a given volume of material under the action of an electric field.

As used herein, 'dielectric loss factor ($\varepsilon''$)' refers to a measure of how much energy is absorbed by a medium when an electromagnetic wave passes through it.

As used herein, the term 'electrode' refers to an electrical conductor used to contact a non-metallic part of a circuit, such as a semiconductor, an electrolyte, a vacuum, or air.

As used herein, the term "capacitance" refers to the capability of a material/device to store electric charge.

The term "electrically conductive" as used herein references materials which have a conductivity at least 0.01 S/cm, in particular of at least 0.1 S/cm or at least 1 S/cm. Where applicable, the terms "surface electrical conductivity" and "volume electrical conductivity" are used in accordance with their standard meanings given in ASTM D1711-22 *Standard Terminology Relating to Electrical Insulation*. Electrical conductivity may be measured in accordance with ASTM 257-14 (2021) *Standard Test Methods for DC Resistance or Conductance of Insulating Materials*.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed to a copper oxide-magnesium aluminate spinel nanocomposite ($CuO \cdot MgAl_2O_4$) and to the effect of modification of $MgAl_2O_4$ with copper oxide (CuO) upon dielectric dispersion, and electrical conductivity. The $CuO \cdot MgAl_2O_4$ nanocomposite shows enhanced electrical conductivity and dielectric properties providing for the utility of the nanocomposite in energy storage applications, such as supercapacitors.

A nanocomposite is described. The nanocomposite demonstrates ionic conductivity and has a general formula $CuO \cdot MgAl_2O_4$. The $CuO \cdot MgAl_2O_4$ NPs have a spinel oxide crystal structure. The spinel phase is a mixed oxide with the general formula $AB_2O_4$, including one divalent cation ($A^{2+}$) and two trivalent cations ($B^{3+}$). The unit cell consists of a face-centered cubic arrangement of oxygen ions, containing 32 $O^{2-}$ ions, with 64 tetrahedral and 32 octahedral sites occupied by $A^{2+}$ and $B^{3+}$ cations. When one half of the octahedral interstices are occupied by $B^{3+}$ cations and one-eighth of the tetrahedral sites are occupied by $A^{2+}$ cations, the spinel phase is termed "normal". Conversely, when tetrahedral sites are occupied by half of the $B^{3+}$ and octahedral sites by the other half along with $A^{2+}$, the spinel phase is termed "inverse".

The spinel phase with the chemical formula $MgAl_2O_4$ is a mineral type of this oxide family. $MgAl_2O_4$ has been widely used in various applications, such as in metallurgical, electrochemical, radio-technical, and chemical industrial fields owing to its high thermal stability (melting point at 2135° C., high hardness (16 gigapascal (GPa)), high mechanical resistance, high resistance against chemical attack, wide band gap energy, high electrical resistivity, relatively low thermal expansion coefficient ($9.10^{-6}$ 1/° C.) between 3° and 1400° C., low dielectric constant, low density (3.58 gram per cubic centimeter (g/cm$^3$)), high thermal shock resistance, hydrophobicity, and low surface acidity. Doping of the oxide with copper (Cu) can manipulate these features due to the vacant 56 tetrahedral and 16 octahedral sites, as well as the order-disorder transitions of cations at these sites in an otherwise typical spinel structure, as indicated by the formula $(Mg)^{tet}(Al)_2{}^{oct}O_4$.

In some embodiments, the nanocomposite comprises CuO in an amount of from about 5 to about 15 wt. % of the total weight of the nanocomposite, for example from about 6 to about-14 wt. %, or from about 7 to about 13 wt. %. In some embodiments, CuO constitutes from about 8 to about 12 wt. % and preferably from about 9 to about 11 wt. % of the total weight of the nanocomposite. In a preferred embodiment, CuO constitutes about 10 wt. % of the total weight of the nanocomposite.

In some embodiments, CuO is present as a monoclinic crystal phase within the nanocomposite, as determined by X-ray diffraction (XRD). The monoclinic phase demonstrates good thermal stability and mechanical strength. In alternate embodiments, CuO may exist in other crystal phases including cubic, tetragonal, hexagonal, and orthorhombic phases.

In some embodiments, the nanocomposite is in the form of nanoparticles (NPs). The nanoparticles of $CuO \cdot MgAl_2O_4$ may possess various morphological forms. It is envisaged, for example, that nanoparticles of $CuO \cdot MgAl_2O_4$ that are fibrous, acicular, spherical, ellipsoidal, cylindrical, bead-like, cubic or platelet-like may be present alone or in combination. Moreover, it is envisaged that agglomerates of nanoparticles having the same or different morphologies may be present in the nanocomposite.

In an embodiment, the nanocomposite comprises clusters of nanoparticles. The nanocomposite may, in particular, comprise a net-like configuration in which interstitial spaces are disposed between clusters of nanoparticles. The interstitial spaces may be of similar or different sizes but in certain embodiments, may each have a longest diameter of from about 0.1 to about 5 μm, for example from about 0.1 to about 4 μm, from about 0.1 to about 3 μm. The interstitial spaces may be conjoined by linear structures of which portions have a thickness and height of from about 1 to about 10 μm, for example from about 1 to about 8 μm or from about 1 to about 5 μm.

In some embodiments, the nanocomposite is in the form of nanoparticles having a median volume particle size (Dv50) of from about 20 to about 40 nm, for example from about 21 to about 39 nm, from about 22 to about 38 nm, from about 23 to about 37 nm or from about 24 to about 36 nm, as determined by scanning electron microscope (SEM) analysis. In some embodiments, the nanocomposite is in the form of NPs having a median volume particle size (Dv50) of from about 25 to about 35 nm, preferably from about 26 to about 34 nm, more preferably from about 27 to about 33 nm, even more preferably from about 28 to about 32 nm, and most preferably from about 29 to about 31 nm, as determined by SEM analysis.

In some embodiments, the nanocomposite demonstrates alternating current (AC) conductivity ($\sigma$). The AC conductivity demonstrates a frequency ($\omega$) dependent relationship according to the formula: $\sigma AC(\omega) = A\omega^s$, wherein: A is a constant; and, s is from about 0.5 to about 0.9, for example from about 0.6 to about 0.8. In some embodiments, s is from about 0.7 to about 0.8, preferably from about 0.71 to about 0.79, more preferably from about 0.72 to about 0.78. In other embodiments, s is from about 0.73 to about 0.77, and preferably from about 0.73 to about 0.76.

In some embodiments, the nanocomposite has a dielectric constant ($\varepsilon'_r$) which, as determined at a temperature of about 25 degrees Celsius (° C.), negatively depends on the frequency of an AC applied to the nanocomposite. Thus, where the frequency of the applied alternating current is increased, the dielectric constant ($\varepsilon'_r$) of the nanocomposite will decrease. Conversely, where the frequency of the applied alternating current is decreased, the dielectric constant ($\varepsilon'_r$) of the nanocomposite will increase. This behavior suggests that the ability of nanocomposite to store electrical energy reduces with higher frequencies, generally because of the reduced mobility of dipoles or charge carriers at those frequencies. In some embodiments, the nanocomposite has a dielectric constant ($\varepsilon'_r$), as determined at a temperature of about 25° C. and at an applied AC frequency ($\omega$) of about 2.5 megahertz (MHz), of from about 13 to about-14, for example from about 13.1 to about 13.9, from about 13.2 to about 13.8, from about 13.3 to about 13.7, or from about 13.4 to about 13.6. In some embodiments, the nanocomposite has a dielectric constant ($\varepsilon'_r$) as determined at a temperature of about 25° C. and at an applied AC frequency ($\omega$) of about 7.5 MHz of from about 11 to about 12, for example from about 11.1 to about 11.9, from 11.2 to about 11.8, from about 11.3 to about 11.7, or from about 11.4 to about 11.6.

In some embodiments, the nanocomposite has a dielectric loss factor ($\varepsilon''$) which, as determined at a temperature of about 25° C., negatively correlates to the frequency of an AC applied to the nanocomposite. In some embodiments, the nanocomposite has: a dielectric constant ($\varepsilon'_r$) which, as determined at a temperature of about 25° C., negatively depends on the frequency of an AC applied to the nanocomposite; and, a dielectric loss factor ($\varepsilon''$) which, as determined at a temperature of about 25° C., negatively correlates to the frequency of an AC applied to the nanocomposite.

Figure 1:
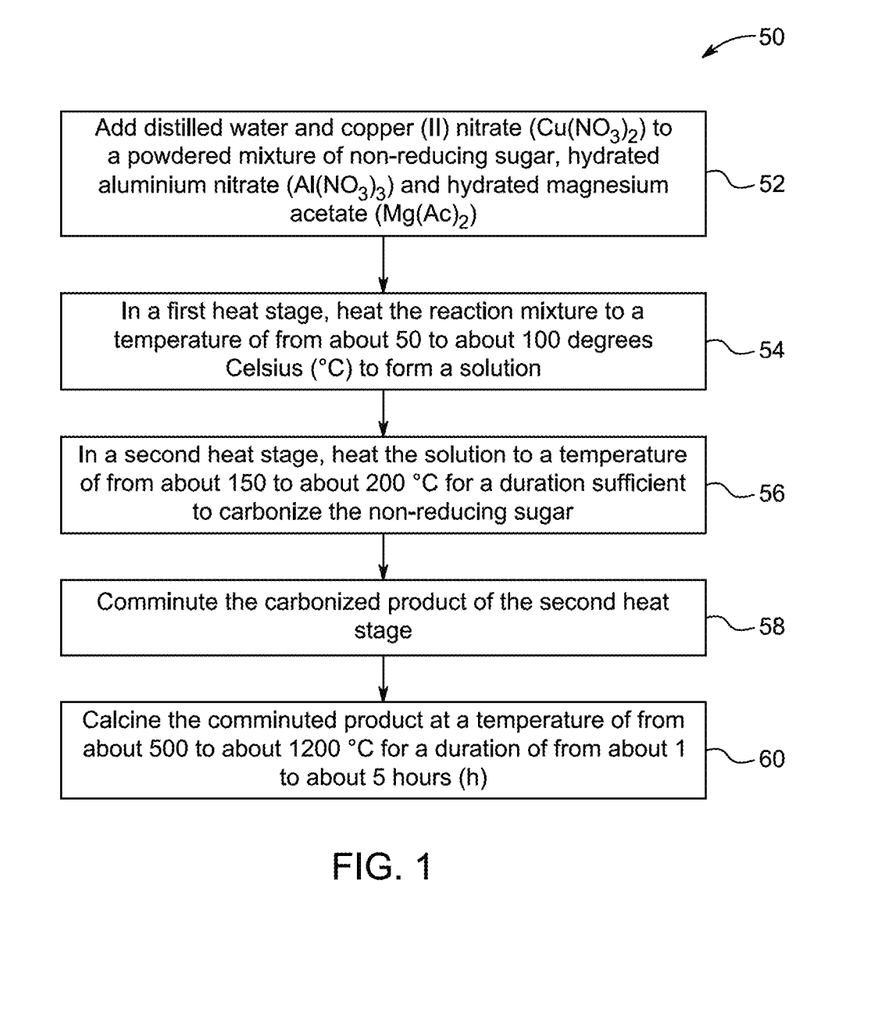
FIG. 1 is a method flowchart for synthesizing a copper oxide-magnesium aluminate spinel nanocomposite ($CuO \cdot MgAl_2O_4$), according to certain embodiments.

FIG. 1 illustrates a flow chart of an exemplary method 50 of synthesizing the $CuO \cdot MgAl_2O_4$ nanocomposite of the present disclosure. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes adding distilled water and copper (II) nitrate ($Cu(NO_3)_2$) to a powdered mixture of non-reducing sugar, hydrated aluminium nitrate ($Al(NO_3)_3$) and hydrated magnesium acetate ($Mg(Ac)_2$). In alternate embodiments, the water may be tap water, distilled water, deionized water, deionized distilled water, reverse osmosis water, and/or some other water.

In alternate embodiments, the copper salt used at step 52 may be selected from the group consisting of copper benzoate, tetraammine copper nitrate, copper citrate, copper oxide, copper bromide, copper oxalate, copper bromide, copper chloride, copper chloride, copper sulfate, copper carbonate, copper oxide, copper fluoride and copper iodide or its hydrate, and mixtures thereof. In other alternate embodiments, the aluminium salt used at step 52 may be selected from the group consisting of aluminium sulfate, aluminium chloride, aluminium phosphate, aluminium acetate, aluminium hydroxide, aluminium citrate or its hydrate, and mixtures thereof. In alternate embodiments, the magnesium salt used at step 52 may be selected from the group consisting of magnesium sulfate, magnesium chloride, magnesium bromide, magnesium citrate, magnesium hydroxide, magnesium carbonate, or magnesium lactate or its hydrate, and mixtures thereof.

A non-reducing sugar is a carbohydrate that is not oxidized by a weak oxidizing agent in a basic aqueous solution. Non-reducing sugars do not have a hydroxyl (—OH) group attached to the anomeric carbon so they cannot reduce other compounds. All monosaccharides such as glucose are reducing sugars. A disaccharide can be a reducing sugar or a non-reducing sugar. In some embodiments, the non-reducing sugar comprises at least one compound selected from the group consisting of sucrose, lactose, raffinose, stachyose, trehalose, sorbose, sucralose, melezitose, raffinose and mixtures thereof. In a preferred embodiment, the non-reducing sugar comprises sucrose. In some embodiments, the reaction mixture comprises, based on the solids content of the reaction mixture, from about 10 to about 25 wt. %, for example from about 11 to about 24 wt. %, from about 12 to about 23 wt. %, from about 13 to about 22 wt. %, from aboutl 14-21 wt. %, or from about 15 to about 20 wt. % of non-reducing sugar based on the solids content of the reaction mixture.

At step 54, the method 50 includes heating the reaction mixture to a temperature of from about 50 to about 100° C., preferably from about 60 to about 100° C., more preferably from about 70 to about 100° C. to form a solution in a first heating stage. For example, the reaction mixture may be heated to a temperature of from about 80 to about 100° C. or from about 90 to about 100° C. to form the solution in this first heating stage. In a preferred embodiment, the solution is heated at a temperature of 100° C. in the first heating stage. The reaction mixture may be heated using heating appliances such as hot plates, heating mantles, hot air ovens, microwaves, autoclaves, tapes, oil baths, salt baths, sand baths, air baths, hot-tube furnaces, and hot-air guns.

At step 56, the method 50 includes heating the solution to a temperature of from about 150 to about 200° C. for a duration sufficient to carbonize the non-reducing sugar in a second heating stage. For example, the solution may be heated to a temperature of from about 155 to aboutl 195° C., preferably from about 160 to about 190° C., more preferably for about 165 to aboutl 185° C., and most preferably 170-185° C., for a duration sufficient to carbonize the non-reducing sugar in this second heating stage. The controlled temperature guarantees that the sugar is thermally decomposed, resulting in the formation of carbonaceous compounds and gases. In a preferred embodiment, the solution is heated at a temperature of 180° C. in the second heating stage.

At step 58, the method 50 includes comminuting the carbonized product of the second heating stage. Comminuting may be done by grinding, crushing, cutting, vibrating, or other processes. In a preferred embodiment, the carbonized product is comminuted via grinding using a motorized particle grinder. Grinding may provide efficient and consistent particle size reduction and enhance the surface area of nanocomposite particles.

At step 60, the method 50 includes calcining the comminuted product. The calcination is typically carried out by heating it to a high temperature, under a restricted supply of ambient oxygen. This is performed to remove impurities or volatile substances and to induce thermal decomposition. Typically, the calcination is carried out in a furnace which is preferably equipped with a temperature control system and which may provide a controlled heating rate of up to about 50 degrees Celsius per minute (° C./min), for instance up to about 40° C./min, up to about 30° C./min, up to about 20° C./min, up to about 10° C./min, up to about 5° C./min, up to about 2° C./min, or up to about 1° C./min.

The comminuted product is calcined at a temperature of from about 500 to about 1200° C. for a duration of from about 1-5 hours. In certain embodiments, the comminuted product is calcined at a temperature of from about 600 to about 1100° C., preferably from about 600 to about 1000° C., and more preferably from about 600 to about 900° C. Independently of, or additional to the selected calcination temperature, the comminuted product may preferably be calcined for a duration of from about 2 to about 4 hours, for example about 3 hours. In some embodiments, the comminuted product is calcined: at a temperature of from about 600 to about 800° C., preferably from about 650 to about 750° C., more preferably from about 680 to about 720° C.; for a duration of from about 2 to about 4 hours, preferably from about 2.5 to about 3.5 hours, and more preferably about 3 hours. In a preferred embodiment, the comminuted product is calcined at a temperature of about 700° C. for about 3 hours.

The product of calcination may retain a carbonaceous residue obtained from the carbonization of the sucrose and the subsequent calcination of the carbonized product. As the calcination of the present disclosure will conventionally occur in the absence of activators or templating agents for the carbonized product, it is considered that the retained carbonaceous residue will comprise amorphous carbon. In certain embodiments, the nanocomposite may comprise amorphous carbon in an amount up to about 2 wt. %, based on the weight of the nanocomposite. For example, the nanocomposite may comprise amorphous carbon in an amount up to about 1 wt. % or up to about 0.5 wt. %, based on the weight of the nanocomposite.

In some embodiments, an electrode is described including the $CuO \cdot MgAl_2O_4$ nanocomposite. The electrode includes an electrically conductive substrate and a layer of $CuO \cdot MgAl_2O_4$ nanoparticles covering the surface of the substrate. The substrate may, for example, be a conductive carbon substrate, graphite substrate, an aluminum foam, a nickel foam, a titanium foam, a titanium alloy foam, an aluminum alloy foam, a magnesium alloy foam, a nickel alloy foam, or a steel foam. In some embodiments, the layer of $CuO \cdot MgAl_2O_4$ nanoparticles may be formed on the surface of the electrically conductive substrate using one or more techniques, such as the drop-casting method, spray coating, spin coating, dip coating, physical vapor deposition (PVD), aerosol-assisted chemical vapor deposition (AACVD), or molecular beam epitaxy (MBE). The coating of $CuO \cdot MgAl_2O_4$ nanoparticles on the substrate or semiconductor forms an electrode which serves as an efficient electrocatalyst for electrocatalytic reactions.

In some embodiments, a fuel cell or capacitor containing an electrode which comprises $CuO \cdot MgAl_2O_4$ nanoparticles is described. A fuel cell is made up of two electrodes, an anode and a cathode, separated by an electrolyte, which facilitates electrochemical reactions that transform fuel (such as hydrogen) into electricity. The anode oxidizes the fuel, releasing electrons and protons, while the cathode combines these electrons and protons with an oxidizing agent (such as oxygen) to produce water and heat. In contrast, a capacitor stores electrical energy in an electric field formed by two conducting plates (electrodes) separated by a dielectric material; when voltage is applied, it accumulates charge and can release energy when required. While both devices use electrodes, fuel cells produce power through chemical reactions, whereas capacitors store and release electrical energy.

EXAMPLES

The following examples demonstrate a copper oxide-magnesium aluminate spinel nanocomposite (CuO·MgAl$_2$O$_4$) for electrochemical applications. The examples are provided solely for illustration and are not to be construed as limitations of the present disclosure, as many variations thereof are possible without departing from the spirit and scope of the present disclosure.

Example 1: Preparation of CuO·MgAl$_2$O$_4$ Nanocomposite

About 10.0 grams (g) of food-grade sucrose, 17.46 g of aluminium nitrate nonahydrate (Al(NO$_3$)$_3$·9H$_2$O) and 25.41 g of hydrated magnesium acetate (Mg(Ac)$_2$.4H$_2$O) were transferred to a 500 milliliters (mL) beaker. The amounts of copper nitrate (Cu(NO$_3$)$_2$) appropriate to produce 10 wt. % CuO·MgAl$_2$O$_4$ were added, followed by 50 mL distilled water. The beaker content was heated to 100 degrees Celsius (° C.) till the content turned to a clear solution. The temperature was raised to about 180° C., and the beaker was heated until the sucrose had carbonized. The resultant black product was ground in a motor and calcined at 700° C. for 3 hours (h). The 10 wt. % CuO·MgAl$_2$O$_4$ nanocomposite was collected.

Figure 2:
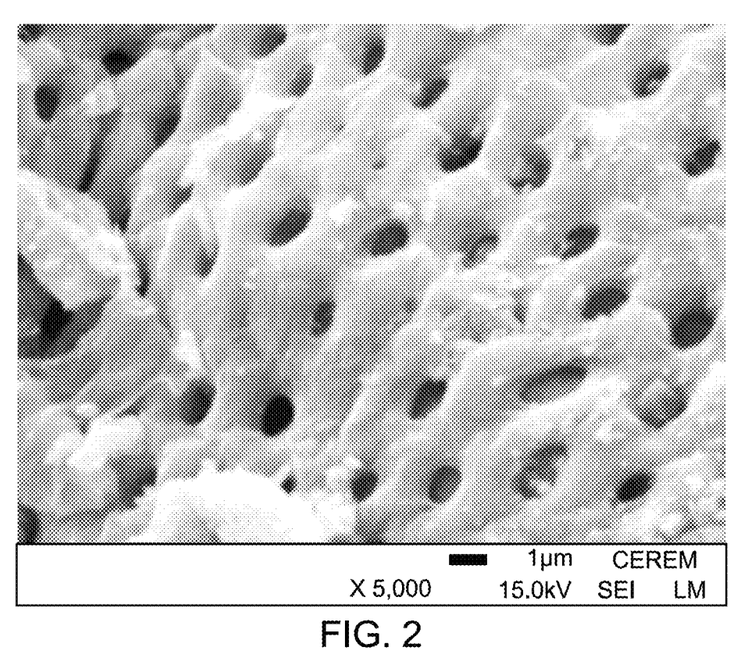
FIG. 2 shows a scanning electron microscopy (SEM) image of a $CuO \cdot MgAl_2O_4$ nanocomposite comprising CuO in an amount of 10 wt. % based on the total weight of the nanocomposite (hereinafter 10 wt. % $CuO \cdot MgAl_2O_4$), according to certain embodiments.
Figure 3:
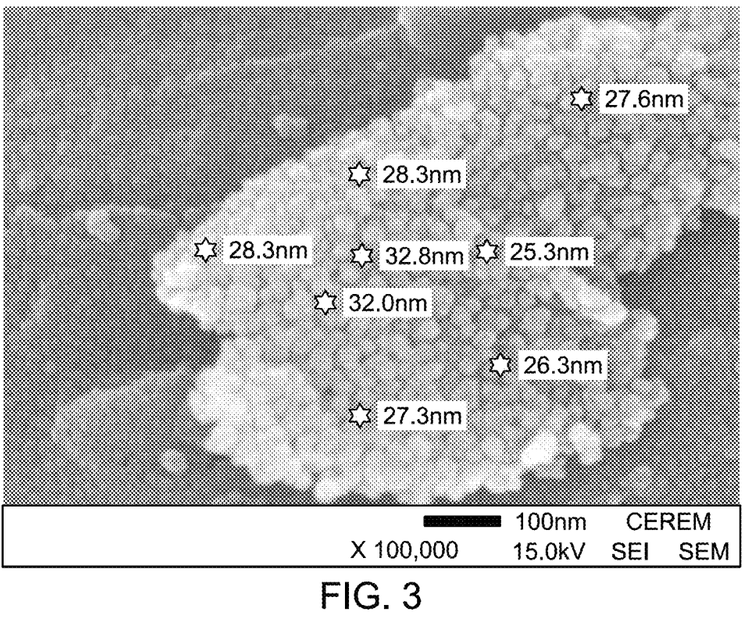
FIG. 3 depicts particle size measurement of the 10 wt. % $CuO \cdot MgAl_2O_4$ nanocomposite via SEM, according to certain embodiments.
Figure 4:
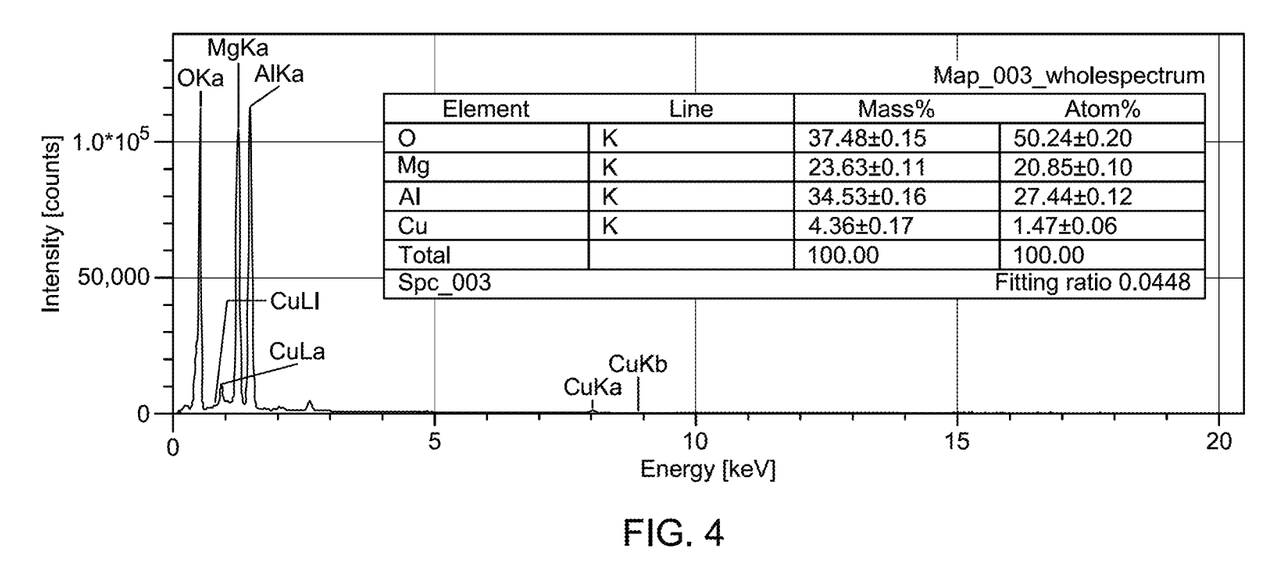
FIG. 4 shows an energy-dispersive X-ray (EDX) spectrum of the 10 wt. % $CuO \cdot MgAl_2O_4$ nanocomposite, according to certain embodiments.
Figure 5:
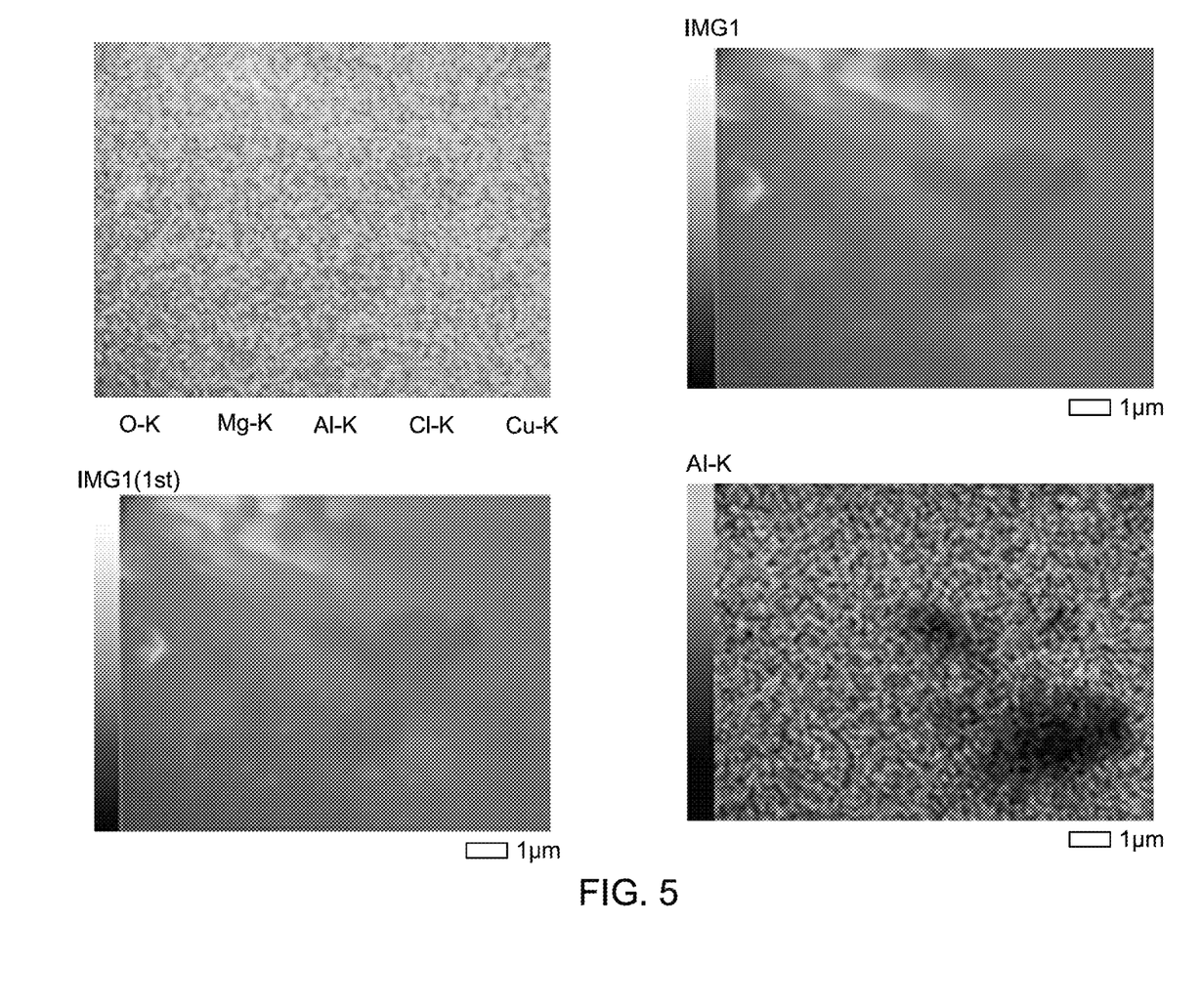
FIG. 5 shows EDX-elemental mapping images of the 10 wt. % $CuO \cdot MgAl_2O_4$ nanocomposite showing images for aluminum (Al), magnesium (Mg), copper (Cu), oxygen (O), chlorine (Cl), according to certain embodiments.

Example 2: Scanning Electron Microscopy (SEM) and Energy-Dispersive X-Ray (EDX) Spectroscopic Analyses The SEM was employed to survey the surficial morphology of the synthesized 10 wt. % CuO·MgAl$_2$O$_4$ nanocomposite. FIG. 2 illustrates the overview image at 5000 magnification, exposing net-like clusters with almost equal micro-holes: the illustrated holes or interstitial spaces are commonly between 0.1 and 2 μm in size. FIG. 3 depicts particle size measurement of 10 wt. % CuO·MgAl$_2$O$_4$ nanocomposite via SEM. The images presented unique fluffy featured nanoparticles with a very narrow size range of 25.5-32.8 nm. Moreover, the EDX analysis was conducted to investigate the elemental composition of 10 wt. % CuO·MgAl$_2$O$_4$ nanocomposite, and the resulting spectrum is depicted in FIG. 4. Moreover, FIG. 5 shows EDX-elemental mapping images of 10 wt. % CuO·MgAl$_2$O$_4$ nanocomposite showing images for aluminum (Al), magnesium (Mg), copper (Cu), oxygen (O), and chlorine (Cl). Thereby, the nanocomposite was prepared with excellent purity, and the elemental mapping reflected an excellently homogenous product.

Example 3: X-Ray Diffraction (XRD) Analysis

Figure 6:
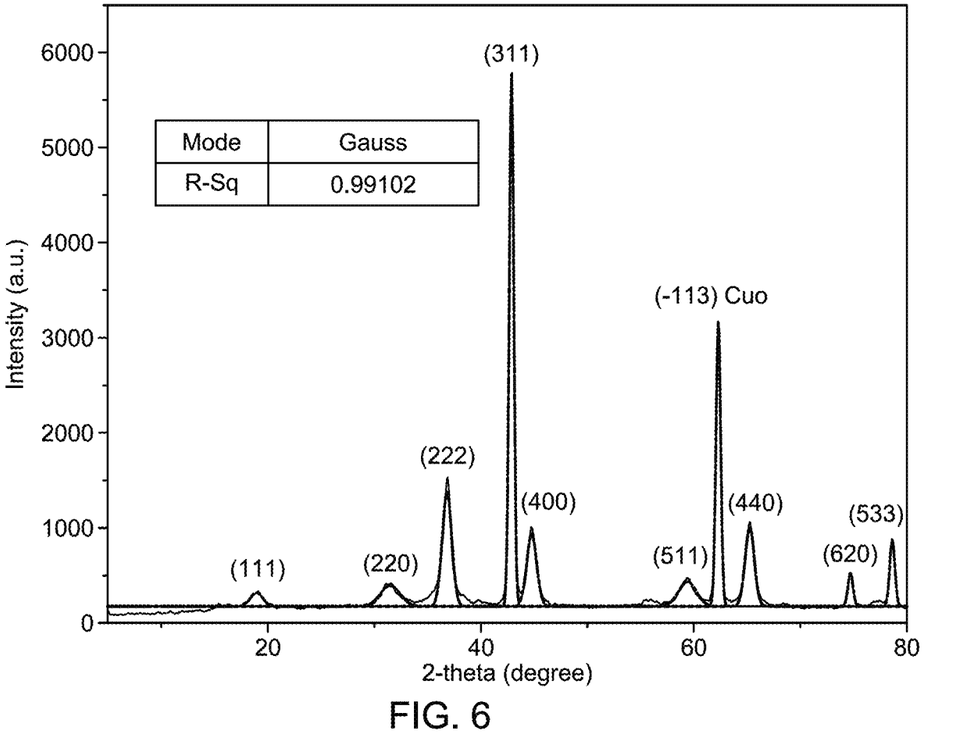
FIG. 6 shows an X-ray diffraction (XRD) pattern of the 10 wt. % $CuO \cdot MgAl_2O_4$ nanocomposite, according to certain embodiments.

The XRD results of the synthesized nanocomposite is shown in FIG. 6. The average crystal size (D) was estimated using the Scherrer equation. Eq. 1, the lattice parameters (a, c) were calculated using Eqs. 2 and 3, while lattice imperfection (F) was computed using Eq. 4 [See: Muhammad Imtiaz, Haifa A. Alyousef, B. M. Alotaibi, Albandari W Alrowaily, Nuha Al-Harbi, A. M. A. Henaish, A. Dahshan, *Fabrication of spinel SrBiO nanomaterials anchored on g-CNnanosheets with enhanced performance of electrode material forenergy storage application, Diamond and Related Materials*, 145 (2024) 111110, Sickafus, K. E.; Wills, J. M *J. Am. Ceram. Soc.* 1999, 82(12), 3279-3292, the disclosure of which is incorporated herein in its entirety].

$$D = 0.9\lambda/\beta \cos\theta \quad (1)$$

$$a = \lambda/\sqrt{3} \sin\theta \quad (2)$$

$$c = \lambda/\sin\theta \quad (3)$$

$$\varepsilon = \beta/4 \cos\theta \quad (4)$$

Where θ and β are Bragg's angle and the peak-width at half-maximum; λ is the source-wavelength-line (Cu-K$_\alpha$=1.5406 Å) [See: Wyckoff R. W G. Wiley *Interscience*, New York, 1964, the disclosure of which is incorporated herein in its entirety.].

Comparing the peaks with the MgAl$_2$O$_4$ spinels (International Centre for Diffraction Data (ICDD) entry JCPDS: 01-086-0083, the disclosure of which is incorporated herein in its entirety), the resulting diffraction peaks at 2θ°=19.0, 31.5, 36.9, 42.9, 44. 8, 59.4, 65. 2, 74.70, and 78.6, the observed peaks in the XRD of nanocomposite can be allocated perfectly to the cubic crystal phases (111), (220), (222), (311), (400, (511), (440), (620), and (533), respectively. The 62.32-20° diffraction peak can be assigned to CuO (according to the International Centre for Diffraction Data (ICDD) entry JCPDS: 01-080-1268 the disclosure of which is incorporated herein in its entirety), and no other significant peaks were observed, which in addition to small D-space (Table 1) can be attributed to the appropriate uniform distribution of CuO within the MgAl$_2$O$_4$.

TABLE 1

The crystal parameters of 10% CuO•MgAl$_2$O$_4$ as computed from XRD pattern.

| 2θ° | D | a | c | ε |
|---|---|---|---|---|
| 18.996 | 5.8E+00 | 1.5E-02 | 9.3E-01 | 5.8E-03 |
| 31.542 | 3.5E+00 | 2.4E-02 | 5.7E-01 | 9.1E-03 |
| 36.866 | 7.1E+00 | 2.8E-02 | 4.9E-01 | 4.4E-03 |
| 42.919 | 1.5E+01 | 3.3E-02 | 4.2E-01 | 2.0E-03 |
| 44.815 | 6.7E+00 | 3.4E-02 | 4.0E-01 | 4.4E-03 |
| 59.426 | 3.5E+00 | 4.4E-02 | 3.1E-01 | 7.5E-03 |
| 62.328 | 1.3E+01 | 4.6E-02 | 3.0E-01 | 1.9E-03 |
| 65.273 | 6.5E+00 | 4.8E-02 | 2.9E-01 | 3.8E-03 |
| 74.727 | 1.1E+01 | 5.4E-02 | 2.5E-01 | 1.9E-03 |
| 78.652 | 1.1E+01 | 5.6E-02 | 2.4E-01 | 1.9E-03 |

Example 4: Electrical Measurements

A two-probe method was used to measure the electrical conductivity (EC) of tablets 10 mm in diameter and about 1 mm thick. The tablets were made by pressing powder under a 2×10$^{-3}$ kilograms per centimeter square (kg/cm$^2$) (196 Pa) pressure. Silver paste is placed on both surfaces of the tablet. The tablets are placed in the oven to remove any moisture. Under typical room conditions, the electrical conductivity, dielectric constant, dielectric loss, and impedance were measured using a programmable automatic LCR bridge (Model HIOKI IM 3536, Nagano, Japan) at a fixed voltage (1.0 V) and frequencies between 1000 hertz (Hz) and 2 megahertz (MHz). The frequency dependent complex dielectric function can be expressed via Eq. (1):

$$\varepsilon^{**}(\omega)=\varepsilon'(\omega)-j\varepsilon''(\omega) \quad (1)$$

With $j=\sqrt{-1}$, the imaginary part of the permittivity is represented by $\varepsilon''$, while the real part is represented by $\varepsilon'$. Eq. (2) and (3) were used to approximate the values for $\varepsilon'$ and $\varepsilon''$:

$$\varepsilon'=Cd/\varepsilon^\circ As \quad (2)$$

$$\varepsilon''(\omega)=\varepsilon'(\omega)\tan\delta \quad (3)$$

where: $\varepsilon^\circ=8.86\times10^{-12}$ farad per meter (F/m)): free space permittivity;
d: Thickness;
As: cross-section area;
Tanδ: dissipative factor; and,
ω(2πf): electric field frequency.

Example 5: Effect of Frequency on AC Conductivity

Figure 7:
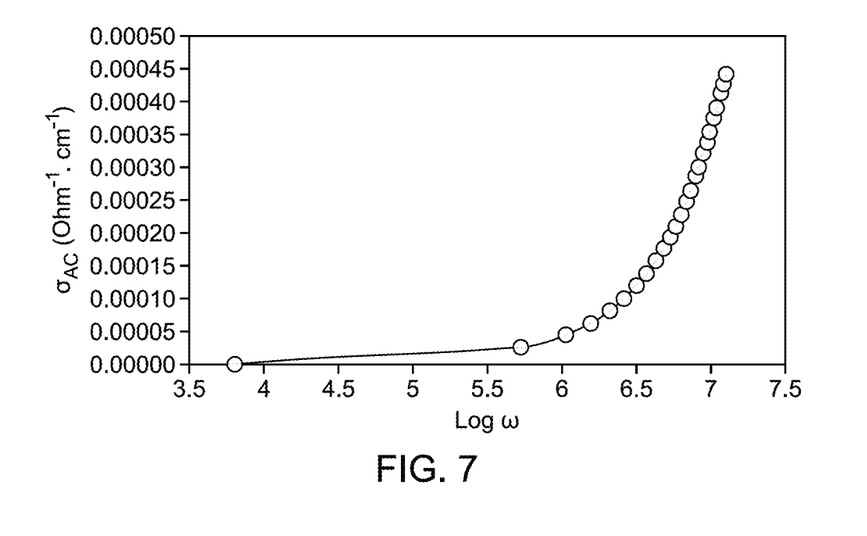
FIG. 7 shows effect of frequency ($\omega$) on alternating current (AC) conductivity ($\sigma$) for a $CuO \cdot MgAl_2O_4$ nanocomposite, according to certain embodiments.

The AC method distinguishes between several mechanisms, such as electrode response, grain boundary conduction, and grain conduction, that contribute to a material's overall conductivity. FIG. 7 shows effect of frequency on AC conductivity (σ) for the CuO·MgAl$_2$O$_4$ nanocomposite. Eq. (4) is utilized to determine the AC conductivity of every sample:

$$\sigma_{AC}=\varepsilon'\varepsilon^0\omega\tan\delta \quad (4)$$

where $\varepsilon^\circ$: vacuum permittivity, $\varepsilon'$: dielectric constant, and Tan δ: the loss tangent.

FIG. 7 shows that, especially at higher frequencies, the AC conductivity increases with frequency. Because high frequency delivers a bigger pumping power to charge carriers, AC conductivity is highest at higher frequencies. An increase in the hopping rate of charge between the charge carriers is sufficient to improve conductivity without increasing the number of charge carriers. The behavior of nanocomposite as a multilayer capacitor of grains and grain boundaries, as predicted by the Koops model [See: Iqbal, M. J.; Ismail, B. J. J. Alloys Compd. 2009, 472, 434-440, the disclosure of which is incorporated herein in its entirety], may be able to explain the increase in AC conductivity with temperature and frequency. A practically continuous plateau area is seen at lower frequencies where the resistive grain boundaries are more active and prevent electronic charge carriers from hopping between them. However, the conductive grains are more active at higher frequencies, allowing charge carriers to hop between neighboring ions.

The release of charge carriers that have been trapped in small areas can lead to a rise in high-frequency conductivity, an increase in the force of the applied field, and increased migration and movement of the released charge carriers in different directions. Significant elements in the material's conduction behavior include liberated charge carriers and electron mobility among many metal ions. Materials used in semiconductors have the following frequency-dependent relationship (Eq. (5)):

$$\sigma_{AC}(\omega)=A\omega^s \quad (5)$$

where A and s are constants.

Figure 8:
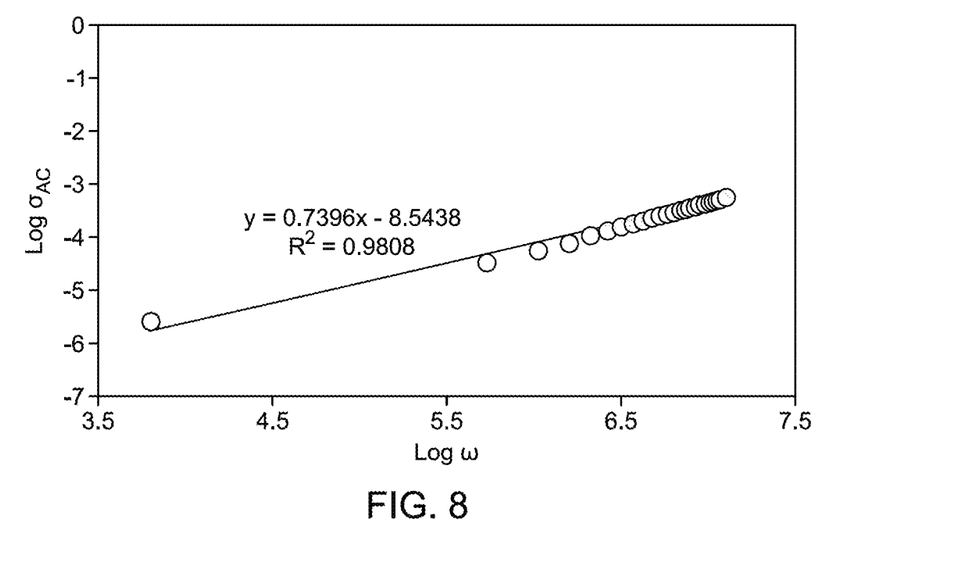
FIG. 8 shows logarithmic relationship between frequency ($\omega$) and alternating current (AC) conductivity ($\sigma$) for a $CuO \cdot MgAl_2O_4$ nanocomposite, according to certain embodiments.

A sudden hopping of the charge carriers results in translational motion if s<1, while a localized hopping of the species is indicated by s>1. The effect is caused by the relaxation resulting from the movement of electrons or atoms by tunneling or hopping between equilibrium locations. The exponent s is determined by graphing the natural logarithm of $\sigma_{AC}(\omega)$ against the natural logarithm of $(\omega)$. FIG. 8 shows the logarithmic relationship between ω and σ for the CuO·MgAl$_2$O$_4$ nanocomposite. The value of s is 0.7396, indicating that correlated barrier hopping (CBH) is the most likely mechanism in the CuO·MgAl$_2$O$_4$ nanocomposite. In general, the relation between the conduction mechanism and s(f) behavior might suggest a suitable model of the conduction mechanism.

Example 6: Dielectric Constant (ε')

Figure 9:
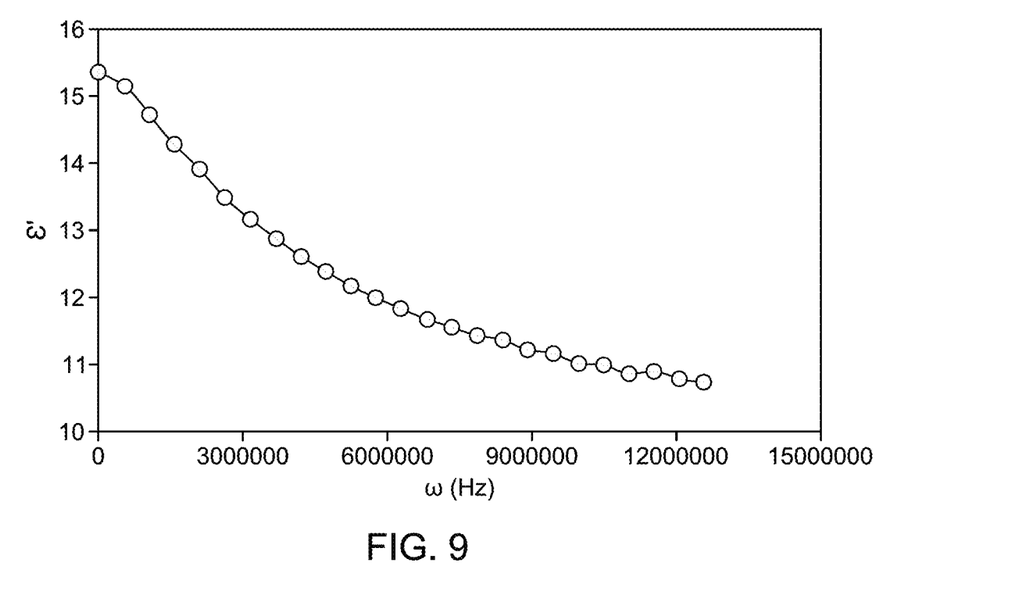
FIG. 9 shows frequency ($\omega$) dependence of the dielectric constant ($\varepsilon'$) for a $CuO \cdot MgAl_2O_4$ nanocomposite, according to certain embodiments.

The frequency dependence of the ε' for the CuO·MgAl$_2$O$_4$ nanocomposite at room temperature is represented in FIG. 9, which shows a dispersion in ε'-values as the frequency increases. At lower frequencies, the decline in ε'-values occurs very quickly, whereas at higher frequencies, approaching a constant value takes longer.

Charge polarization is the storage of some energy in a substance when it is exposed to an external electric field. This stored energy is represented by the real component (ε') of the dielectric constant. Understanding the behavior of microstructural entities, such as grains and grain borders, requires knowledge of the dielectric constant. The graph indicates that for the nanocomposite, ε' drops with increasing frequency. At lower frequencies, this decline was swift, while at higher frequencies, it was more gradual. The observed dielectric behavior can be explained by the hopping process and the idea of polarization. The composite is presumed to be arranged of distinctive structures or regions (grain and grain boundaries) and the grain's conductivity is higher than the grain boundary. Therefore, it is appropriate to say that the higher ε' values are obtained from the charge accumulation at the grain boundaries.

Generally, according to the Koops theory, the interfacial polarization of the Maxwell-Wagner type can be used to analyze the dielectric dispersion curves. These models predict that the ferrite crystal consists of conductor-rich grains separated by conductor-poor grain boundaries. The grain boundaries are more effective at low frequencies, whereas grains are more effective at higher frequencies.

Example 7: Dielectric Loss Factor (ε'')

Figure 10:
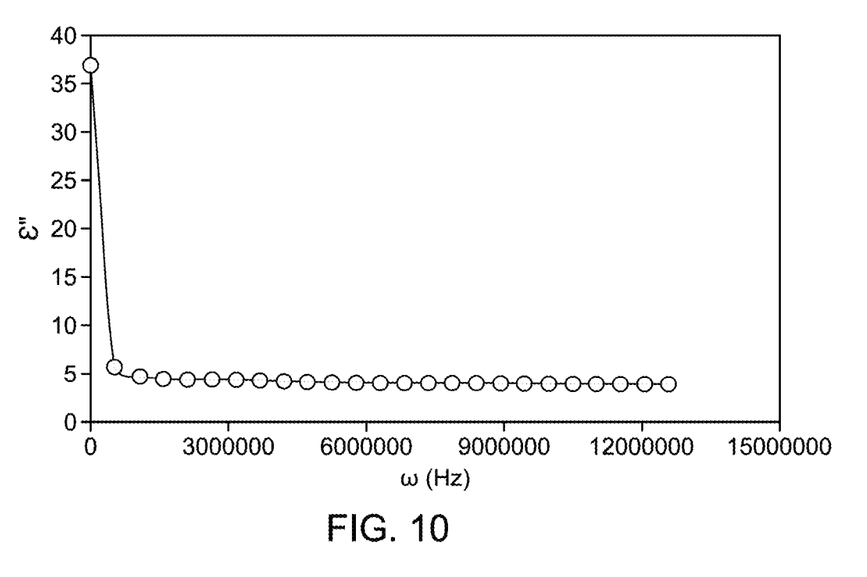
FIG. 10 shows frequency ($\omega$) dependence of the dielectric loss factor ($\varepsilon''$) for the $CuO \cdot MgAl_2O_4$ nanocomposite, according to certain embodiments.

The dielectric loss specifies the quantity of energy lost due to charge carrier movement. The fluctuation of ε'' as a function of frequency for CuO·MgAl$_2$O$_4$ nanocomposite at room temperature is displayed in FIG. 10. The behavior obtained is comparable to that of the real part of the dielectric constant, i.e., it decreases as the frequency increases. The ε''-value rapidly drops in the low-frequency region while it remains low in the high-frequency region. This trend can be elucidated by the fact that in the low-frequency region where the samples possess higher resistivity (because of the grain boundary), additional energy is needed to hop the charges between the cations; thus, the loss is high. In the high-frequency region, where the samples have low resistivity (due to grains), less energy is involved in hopping the charges between the cations at the octahedral sites. The polarization of space charges may potentially cause a decrease in dielectric loss as the frequency increases.

Figure 11:
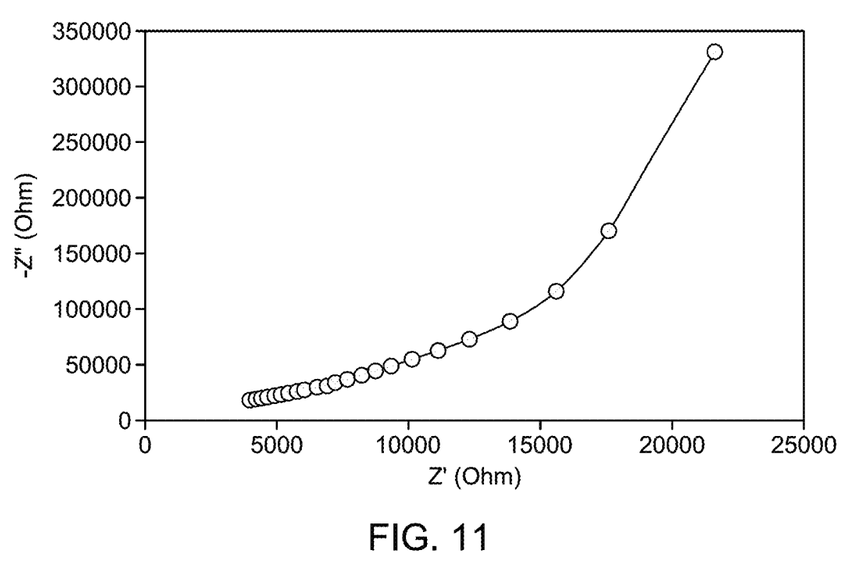
FIG. 11 shows a Nyquist plot for a $CuO \cdot MgAl_2O_4$ nanocomposite, according to certain embodiments.

Impedance spectroscopy is a practical and effective method for establishing the relationship between the electrical characteristics and microstructures of substrates. Generally, the electrochemical impedance spectroscopy (EIS) spectra show distinct semicircles in complex impedance planes as they possess diverse relaxation times. The impedance responses caused by the grain border and the grain itself may overlap if the variation in time constants among the processes is less than one hundred. FIG. 11 shows a Nyquist plot for the CuO·MgAl$_2$O$_4$ nanocomposite showing the complex impedance spectra, from which it can be observed that the complex impedance spectrum shows single depressed semicircle at high frequency region and a low-frequency spur in the complex impedance plots at 303 K support that the conductivities of CuO·MgAl$_2$O$_4$ nanocomposite were ionic.

To conclude, copper oxide-magnesium aluminate spinel nanocomposite (CuO·MgAl$_2$O$_4$) was synthesized by simple carbonization method. The electrical conductivity values for the sample increased with increasing frequency indicating the semiconducting behavior of the sample. The variation of ε', ε", and AC conductivity for the investigated samples at different frequencies has been studied. Both ε' and ε" decreased with the increase of frequency while AC conductivity increased. Koop's phenomenological theory explains the frequency variation of (ε' and ε"). The hopping of electrons and holes is suggested to be the electrical conduction mechanism.

Numerous modifications and variations of the present disclosure are possible in light of the above teachings. It is, therefore, to be understood that within the scope of the appended claims, the invention may be practiced otherwise than as specifically described herein.

The invention claimed is:

1. A nanocomposite having ionic conductivity and having the general formula CuO·MgAl$_2$O$_4$, wherein:
   copper oxide (CuO) is present in an amount of from about 8 to about 12 weight percent (wt. %) of the total weight of the nanocomposite; and,
   CuO is present as a monoclinic crystal phase within the nanocomposite, as determined by X-ray diffraction (XRD),
   wherein the nanocomposite is in the form of a net cluster having interstitial spaces having a longest diameter of from about 0.1 to about 5 m separated by a linear structure with portions of thickness and height of from about 1 to about 5 μm.

2. The nanocomposite according to claim 1, wherein CuO is present in an amount of about 10 wt. % of the total weight of the nanocomposite.

3. The nanocomposite according to claim 1, wherein the nanocomposite has alternating current (AC) conductivity (σ) and further wherein the AC conductivity demonstrates a frequency (ω) dependent relationship according to the Formula:

$$\sigma_{AC}(\omega) = A\omega^s$$

wherein: A is a constant; and,
s is from about 0.5 to about 0.9.

4. The nanocomposite according to claim 1, wherein s is from about 0.7 to about 0.8.

5. The nanocomposite according to claim 1, having a dielectric constant (ε'$_r$) which, as determined at a temperature of about 25 degrees Celsius (° C.), negatively depends on the frequency (ω) of an alternating current applied to the nanocomposite.

6. The nanocomposite according to claim 5, wherein the dielectric constant (ε'$_r$), as determined at a temperature of about 25° C., is:
   from about 13 to about 14 at an applied AC frequency (ω) of about 2.5 megahertz (MHz); and,
   from about 11 to about 12 at an applied frequency (ω) of about 7.5 MHz.

7. The nanocomposite according to claim 1, having a dielectric loss factor (ε") which, as determined at a temperature of about 25° C., negatively correlates to the frequency of an AC applied to the nanocomposite.

8. The nanocomposite according to claim 1, having:
   a dielectric constant (ε'$_r$) which, as determined at a temperature of about 25° C., negatively depends on the frequency of an AC applied to the nanocomposite; and,
   dielectric loss factor (ε") which, as determined at a temperature of about 25° C., negatively correlates to the frequency of an AC applied to the nanocomposite.

9. An electrode including the nanocomposite as defined in claim 1.

10. A fuel cell or capacitor containing the electrode according to claim 9.

* * * * *

UNITED STATES PATENT AND TRADEMARK OFFICE
CERTIFICATE OF CORRECTION

| | | |
|---|---|---|
| PATENT NO. | : 12,281,024 B1 | Page 1 of 1 |
| APPLICATION NO. | : 18/954299 | |
| DATED | : April 22, 2025 | |
| INVENTOR(S) | : Babiker yagoub Elhadi Abdulkhair et al. | |

It is certified that error appears in the above-identified patent and that said Letters Patent is hereby corrected as shown below:

On the Title Page

Item (54) and in the Specification Column 1, Lines 1-3, should read:
- COPPER OXIDE-MAGNESIUM ALUMINATE ($CuO \cdot MgAl_2O_4$) SPINEL NANOCOMPOSITE AND METHOD OF SYNTHESIS THEREOF -

Signed and Sealed this
Third Day of June, 2025

Coke Morgan Stewart
*Acting Director of the United States Patent and Trademark Office*